United States Patent [19]

Randel

[11] 4,293,108
[45] Oct. 6, 1981

[54] TAKE-UP DEVICE SPEED CONTROLLER USING MAGNETIC SENSING MEANS

[76] Inventor: Harry M. Randel, 574 W. Court, Scotch Plains, N.J. 07076

[21] Appl. No.: 128,141

[22] Filed: Mar. 7, 1980

[51] Int. Cl.³ .......................................... B65H 59/38
[52] U.S. Cl. .................................. 242/189; 242/75.3
[58] Field of Search ...................... 242/75, 75.3, 75.5, 242/75.51, 189, 190; 226/10, 24; 318/6, 7

[56] References Cited

U.S. PATENT DOCUMENTS

| 2,904,275 | 9/1959 | Selsted et al. | 242/189 |
| 3,172,611 | 3/1965 | Harris | 242/190 |
| 3,780,959 | 12/1973 | Burth | 242/55.18 |
| 4,169,566 | 10/1979 | Boudouris | 242/55.18 |

*Primary Examiner*—Leonard D. Christian
*Attorney, Agent, or Firm*—Craig and Antonelli

[57] ABSTRACT

In systems for taking up elongated strips on a take-up device, such as taking up film onto a film platter, it is desirable to have an arrangement for controlling the speed of the take-up device in accordance with the amount of slack in the strip. To accomplish this, a slack indicating means, such as a film roller, is located between a strip supply means and the take-up device so that the strip passes over it. The slack indicating means has a magnet coupled to it. The position of the slack indicating means along a predetermined path is determined by the effect of the magnet on the operative state of a plurality of magnetically actuated switches located along the predetermined path. The operative state of these switches, in turn, controls the speed of the take-up device by controlling a resistive circuit or other control means.

14 Claims, 2 Drawing Figures

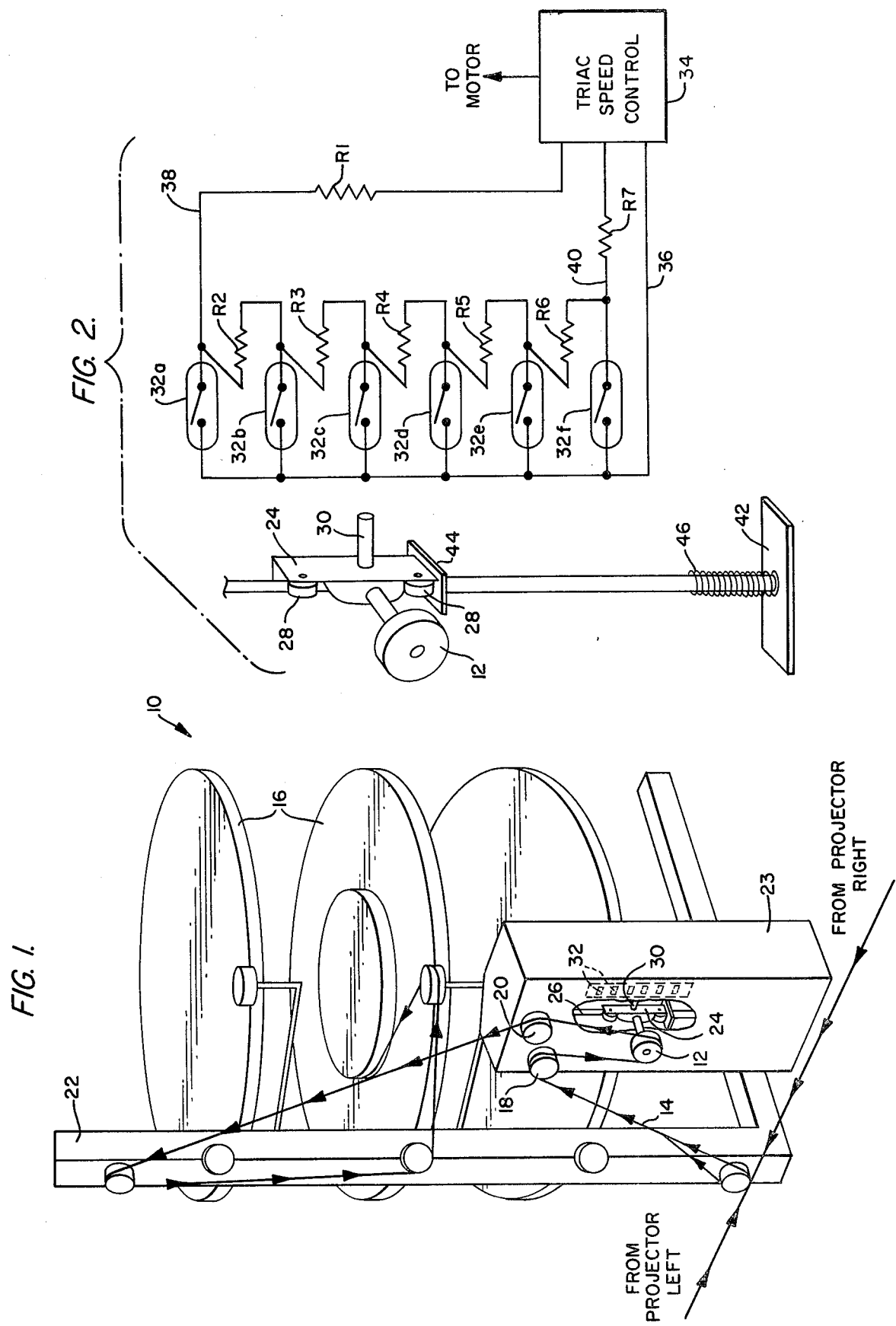

4,293,108

TAKE-UP DEVICE SPEED CONTROLLER USING MAGNETIC SENSING MEANS

FIELD OF THE INVENTION

Generally, the present invention relates to take-up devices for elongated strips, and, more particularly, to a magnetic speed control method and apparatus for controlling the speed of an elongated strip take-up device.

BACKGROUND OF THE INVENTION

In modern high-speed take-up devices, such as take-up platters used for movie film strips, it is generally necessary to control the speed of the take-up device based on the slack of the film during the take-up operation. If this is not done, the high speed take-up device would snap the film if all slack has been removed. On the other hand, the film could become tangled if excess slack developed.

A variety of speed control arrangements based on film slack have been developed. Many of these utilized a slack indicating roller 12 (sometimes referred to as a "yoyo") shown in the take-up device 10 in FIG. 1. A film strip 14 which is being wound onto a selected one of three platters 16 from a supply such as one or more projectors (not shown) passes over a pair of stationary rollers 18 and 20 and the slack indicating roller 12. The particular platter upon which the film 14 is being wound is determined by the rollers which are being used on a vertical feed rod 22 in a conventional manner.

The actual amount of film slack is indicated by the position of the slack indicating roller 12 which travels up and down in a vertical slot in a control housing 23 in accordance with the slack. As the slack increases, the roller 12 will drop due to gravity. As the slack decreases, the film strip 14 will overcome the gravitational pull to force the roller 12 upward.

A variety of techniques have been developed for sensing the position of the slack indicating roller 12 and using it to control the take-up speed of the platter 16. For example, one approach is to use a photoelectric sensor coupled to a solid state speed control circuit. Although this can work effectively, it is somewhat complicated and is subject to malfunctions either in the light transmitters or receivers.

Another approach in common usage is to attach a string to the roller. The string is wound such that the position of the roller 12 will control the string to set the resistance in a multi-turn potentiometer. Although this latter approach has gained widespread usage, it suffers from a serious drawback. Specifically, due to the constant back and forth pulling on the string during the take-up operation, the string wears out and breaks relatively frequently. Replacing the strings is somewhat time consuming. More importantly, it often occurs at very inconvenient times while movie patrons await the beginning of the next show.

SUMMARY OF THE INVENTION

Accordingly, it is an object of the present invention to provide an improved speed control method and apparatus for strip take-up devices.

Further, it is an object of the present invention to provide an improved speed control method and apparatus for strip take-up devices which avoids the problems of frequent breakdown or complex circuitry found in prior art devices.

To accomplish these and other objects, the present invention mounts a magnet on the slack indicating roller. The position of the slack indicating roller along its predetermined path can then be readily determined by the effect of the magnet on the operative state of a plurality of magnetically actuated switches located along the path. The operative state of the switches is used to control the speed of the take-up device through a resistive network or other appropriate means.

BRIEF DESCRIPTION OF THE DRAWINGS

FIG. 1 shows an embodiment of the present invention coupled to a conventional slack indicating roller for a film platter speed controller; and FIG. 2 is a more detailed view of the invention showing an embodiment of a circuit for speed control and the details of the carriage for mounting the slack indicating roller.

DETAILED DESCRIPTION OF THE PREFERRED EMBODIMENTS

Referring again to FIG. 1, the present invention contemplates a modification of a conventional take-up device 10. Specifically, the slack indicating roller 12 is attached to a carriage 24 adapted for movement up and down on a vertical carriage track 26. Generally, wheels 28 are incorporated for facilitating the carriage movement, although other arrangements could be employed.

An important aspect of the present invention is the attachment of a magnet 30 to the carriage 24. As can be seen in FIG. 1, by virtue of this magnet 30, the movement of the carriage 24, and hence the slack indicating roller 12, can be sensed by a magnetic sensing means. For this purpose, the present invention contemplates a plurality of magnetically actuatable switches 32a–32f located along the path of travel of the carriage 24. These switches 32 are illustrated as reed switches, although other magnetically actuatable switches could, of course, be used. Six such switches are shown as an example. But, of course, any desired number of switches could be used.

FIG. 2 shows a more detailed view of the present invention, with like numbers indicating like elements as in FIG. 1. As shown in FIG. 2, in accordance with one embodiment of the present invention, the magnetically actuated switches 32 are electrically parallel to one another, and are normally in an open position. However, when the magnet 30 is adjacent one of the magnetically actuatable switches 32, it will cause it to close. For example, in FIG. 2, switch 32c is shown in a closed position due to the proximity of the magnet 30. Preferably, in accordance with the FIG. 2 embodiment, the strength of the magnet 30, the spacing of the switches 32, and the sensitivity of the switches 32, are set such that only one switch 32 will be closed at any one time.

By virtue of the above-described arrangement, the position of the magnet 30, and hence of the carriage 24 and the roller 12, can be indicated by noting which of the switches, 32a–32f is closed. Since the position of the roller 12 is a function of the slack of the film in the strip 14, it can be seen that the switch 32a will indicate a minimum slack while the switch 32f will indicate a maximum allowable slack.

A conventional Triac speed control unit 34 (or other conventional semiconductor speed controller) is coupled to the switches 32a–32f for controlling the speed of the platter 16 based on which of the switches is closed. As shown in FIG. 2, a first lead 36 is coupled from the Triac in common with one end of each of the switches 32a–32f. The second end of each of the switches 32a–32f is connected to the speed controller 34 through a resistance network made up of resistors R1 to R7. Specifically, the second end of the switch 32a is coupled to the speed controller 34 through a first resistor R1 along the lead 38. The second end of the switch 32f is coupled to the speed controller 34 through a resistance R7 along a lead 40. Between the leads 38 and 40, a series ladder of resistors $R_2$ to $R_6$ is formed with the second end of a switch 32 coupled at each junction point between these resistors.

The particular resistance value of the resistors R1 to R7 is chosen to achieve the necessary resistance for the speed control effect desired. For example, in a preferred embodiment, the resistance value will be set so that it corresponds to a minimum speed drive for the platter 16 when the switch 32a is closed. The reason for this is because the slack will be quite low at this point, and it is desired to slow down the platter 16 to avoid pulling the strip 14 taunt and snapping it. On the other hand, the resistance is set for maximum speed of the platter 16 when the switch 32f is closed. This is the case since 32f will indicate the maximum allowable slack for the film strip 14, and it is desirable to increase the platter speed to lessen this amount of slack.

By utilizing the arrangement described above in regard to FIGS. 1 and 2, a significant advantage is achieved in not requiring any structural connection (such as the prior art string arrangement) between the movement of the carriage 24 and the setting of the resistance network. Also, the circuitry is quite simple, and does not require the complexities of light transmission and reception found in certain prior art systems. Only a magnetic coupling is required. This will greatly reduce the likelihood of breakdown relative to prior art arrangements.

FIG. 2 also shows another feature of the present invention for improving the operation relative to prior art devices. Specifically, in most prior art devices a bracket is coupled along one side of the carriage 24 to contact a spring located on the bottom platform 42 to soften the carriage's arrival at the lowest allowable carriage position. The problem which developed with this arrangement was that the spring tended to slide off the bracket and wedge the carriage 24 into its lowest position.

The structure shown in FIG. 2 overcomes these problems by providing a bracket 44 at the bottom of the carriage 24. A hole is provided in the bracket 44 so that it can pass up and down on the vertical carriage track 26. Also, a spring 46 is located at the bottom of the vertical carriage track 26 on the platform 42. With this arrangement, the spring encircles the track 26, and is essentially locked in place. Therefore, it will not be possible to slide this spring 46 off the bracket 44 to wedge the carriage 24.

Although the above description sets forth a particular arrangement of resistors, it is to be understood that other resistance networks could be used. Also, other networks made of elements other than simple resistors could be used if desired.

Similarly, although the above description specifically shows a roller for use as a slack indicating means, it is to be understood that other slack indicating means could be used, if desired.

Further, although the above description is in terms of a film take-up arrangement on a horizontal movie film platter, it is to be understood that the present invention could be used on other take-up devices, either vertical or horizontal, and for a variety of types of elongated strips (e.g. paper tape, string, etc.).

Finally, although reed switches are shown in illustrating this invention, other appropriate magnetically actuatable arrangements could be used.

It is to be understood that the above-described arrangements are simply illustrative of the application of the principles of this invention. Numerous other arrangements may be readily devised by those skilled in the art which embody the principles of the invention and fall within its spirit and scope.

I claim:

1. A control system for controlling the speed of a take-up device upon which an elongated strip is being wound from a supply means, comprising:
    a slack indicating means provided between the supply means and the take-up device so that the strip passes over the slack indicating means, wherein the position of the slack indicating means along a predetermined path is determined by the amount of slack in the strip as it passes from the supply means to the take-up device;
    means for sensing the position of the slack indicating means including a magnet coupled to the slack indicating means for movement with it, and a plurality of magnetically actuatable means arranged along the predetermined path, wherein the operative condition of the magnetically actuatable means is controlled by the position of the magnet relative to the magnetically actuatable means; and
    speed control means coupled to the magnetically actuatable means for controlling the take-up device in accordance with the operative state of the magnetically actuatable means.

2. A system according to claim 1, wherein the elongated strip is a film strip, the take-up device is a film platter, the slack indicating device is a roller positioned for vertical up and down motion along a predetermined vertical path in accordance with the vertical slack of the film strip, and the magnetically actuatable means are switches.

3. A system according to either claim 1 or 2, wherein the speed control means increases the speed of the take-up device as the slack increases and decreases the speed of the take-up device as the slack decreases.

4. A system according to claim 2, further comprising a vertical rod adjacent to the vertical path and a carriage mounted on said vertical rod for vertical up and down motion along said vertical rod, wherein said roller and said magnet are mounted on the carriage.

5. A system according to claim 2, wherein the switches are normally in an open non-operative position, and wherein the magnet closes the individual switches when it passes within a predetermined distance of said individual switches.

6. A system according to claim 5, wherein the magnet is spaced relative to the switches such that only one switch will be closed at a time by said magnet.

7. A system according to claim 6, wherein the switches are arranged in parallel circuit arrangement to one another, and wherein each switch is in series with a resistor such that the closure of a particular switch determines the particular value of resistance in the speed control means, and further wherein the resistance value determines the take-up device speed.

8. A system according to claim 4, further comprising:

a bracket mounted on the bottom of the carriage; and
a spring mounted at the bottom of the vertical rod encircling the rod,
wherein the bracket is adapted to engage the spring when the carriage has dropped near the bottom of the vertical rod to provide a smooth control stop for the lowermost travel of the carriage.

9. A method for controlling the drive speed of a take-up device upon which an elongated strip is being wound from a supply means comprising:

passing the strip over a slack indicating means wherein the position of the slack indicating means along a predetermined path is determined by the amount of slack in the strip as it passes from the supply means to the take-up device, and wherein the slack indicating means has a magnet coupled thereto;

sensing the position of the slack indicating means by determining the position of the magnet coupled to the slack indicating means by the effect of the magnet on the operating condition of a plurality of magnetically actuatable means located along the predetermined path; and controlling the speed of the take-up device in accordance with the operative condition of the magnetically actuatable means.

10. A method according to claim 9, wherein the elongated strip is a film strip, the take-up device is a film platter, the slack indicating device is a roller positioned for vertical up and down motion along a predetermined vertical path in accordance with the vertical slack of the film strip, and the magnetically actuatable means are switches.

11. A method according to claim 9 or 10, wherein the speed control means increases the speed of the take-up device as the slack increases and decreases the speed of the take-up device as the slack decreases.

12. A method according to claim 10, wherein the switches are normally in an open non-operative position, and wherein the magnet closes the individual switches when it passes within a predetermined distance of said individual switches.

13. A method according to claim 12, wherein the magnet is spaced relative to the switches such that only one switch will be closed at a time by said magnet.

14. A method according to claim 13, further comprising a resistive network coupled to said switches, wherein the operative position of the switches controls the resistive network to determine the speed of the take-up device.

* * * * *